J. G. Stoddard,
Horse Rake.
No. 30,007.　　　　　　　　　　Patented Sep. 11, 1860.
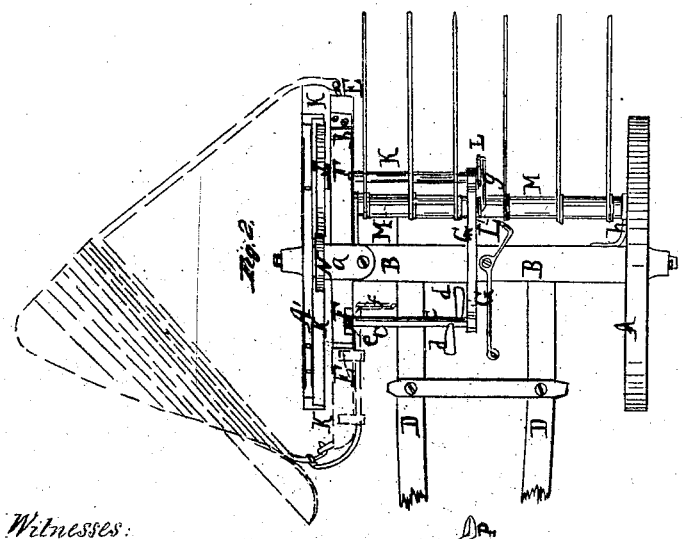
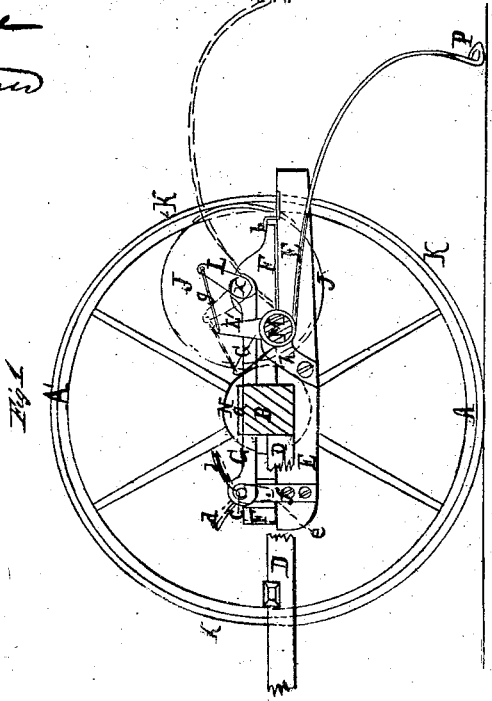
Witnesses:
　　　　　　　　　　　　　　　　Inventor:

UNITED STATES PATENT OFFICE.

J. C. STODDARD, OF WORCESTER, MASSACHUSETTS.

IMPROVEMENT IN HORSE-RAKES.

Specification forming part of Letters Patent No. 30,007, dated September 11, 1860.

*To all whom it may concern:*

Be it known that I, J. C. STODDARD, of Worcester, in the county of Worcester and State of Massachusetts, have invented a new and Improved Horse Hay-Rake; and I do hereby declare that the following is a full, clear, and exact description thereof, reference being had to the accompanying drawings, forming a part of this specification, in which—

Figure 1 represent a vertical longitudinal section taken through my machine, showing the device for operating the rake, with the parts in two positions. Fig. 2 is a plan view of my machine, with a section taken through the wheel that operates the rake. The red lines in this figure represent a device which I shall apply to my rakes for gathering in windrows.

Similar letters of reference indicate corresponding parts in both figures.

This invention is an improvement in raising and holding the tines of the rake down upon the ground by which this operation can be effected instantaneously, and with little or no exertion on the part of the driver. Hand-levers may be dispensed with. Consequently, the driver, who may be a boy, will have a free use of both hands for handling the reins and controlling the horse. The power required to raise or keep the rake-teeth down on the ground during raking is exerted by the horse drawing the machine without gearing, and by a very simple and efficient contrivance.

For effecting this object my invention consists in interposing between a projecting flange on one of the wheels for supporting the rake, frame, &c., and a friction-collar on the hub of said wheel, a friction-wheel having its bearings in a movable piece, which is operated by the driver, so as to alternately bring this friction-wheel in contact with the collar on the hub of the driving-wheel and the flange at the circumference of this wheel. The motion thus obtained by bringing the friction-wheel, respectively, in contact with two opposite surfaces moving in the same direction will, by a suitable attachment of the friction-wheel with the rake-head, hereinafter described, elevate, or by the contact of the friction-wheel with the periphery of the collar keep the rake-teeth down firmly upon the ground with a force which is controlled by the driver, all in the manner hereinafter described and represented.

To enable those skilled in the art to fully understand my invention, I will proceed to describe its construction and operation.

In the accompanying drawings, A A' represent flanged wheels, upon which the rake with the mechanism for operating it is supported, A' being the wheel for operating the rake, as will be hereinafter described. B' is the axle, a little to one side of which are attached thills D. The driver's seat (not shown) is mounted upon the axle B. E is a longitudinal beam attached to the axle on one side of the machine, and on the inside surface of the wheel A'. This comprises the frame-work of the machine, which is made light and strong in the usual manner.

Upon the beam E, recessed into the axle B, and seated between suitable guides, is a movable bearing-block, F, which is held down in its place by a suitable button, $a$, and bent plate $b$, but allowed to have a slight longitudinal movement, which movement is imparted to it by the driver through the medium of foot-levers $d\ d$, their shaft $c$, and vibrating arm $e$. The shaft $c$ has its bearings in a longitudinal middle piece, G, and piece $f$, respectively. The piece $f$ is fixed to the front end of the beam E.

J is a friction-wheel, which is keyed securely to its shaft K, which shaft has its bearings in movable block F, and in the rear end of the longitudinal middle piece, G. The opposite end of the shaft K to the friction-wheel J carries an arm, L, which arm is connected to a similar one, L', projecting from the rake-head M, by a rod, $g$, which rake-head has its bearings in brackets $h\ h$, projecting out from either end of the axle B. The arm L' is fixed at the middle of the rake-head, so that the power to be applied for operating it will be equally distributed over its entire length and in both of its end bearings.

The friction-wheel J is interposed between the flange $k$ of wheel A' and a friction-collar or wheel, N, formed on the inside of the hub of wheel A'. The diameter of the friction-wheel J is slightly less than the distance between the periphery of the collar N and the inside surface of flange $k$ of wheel A', so that the periphery of the friction-wheel J will not come in contact with the two surfaces above mentioned at one time. It will here be seen that two such friction-wheels as that lettered J may be used, and thus dispense with the collar N by bringing each wheel alternately in contact with the wheel's A' flange at opposite points;

but the device herein described will be preferable on account of the side draft, which would be caused by bringing a friction-surface to bear hard upon the circumference of one driving-wheel in order to keep the rake-teeth down upon the ground.

The function and operation of the several parts constituting my invention I will briefly describe as follows: It will be seen by the above description that I dispense with toothed gearing, an objectionable feature to all machines for raking hay, and at the same time accomplish the work of raking up and leaving the hay in windrows by raising the rake at a suitable time, and dropping and holding the teeth down to the ground in a simple manner, and I transfer the labor heretofore required of the driver to the horses; still I place under control of the driver the application of this power at the desired intervals. To this end the friction-wheel J is used, which can be brought in contact with the wheel's flange or the collar N on the hub of this wheel while the machine is in motion, by a simple movement of the feet on the pedals $d\,d$, and the friction of contact between the wheel J and the flange $k$ or the collar N will give motion to the rake, and if it is desired to keep the rake-teeth down on the ground, by placing the foot on the nearest pedal the wheel J will force the rake-teeth down and retain them in this position so long as the foot is kept on the pedal, and by increasing very slightly the pressure on the pedal the rake will be held hard down by the increased friction of the two wheels J N. At a proper time for raising the rake-teeth by gently depressing the opposite pedal, the wheel J will be brought in contact with the flange $k$ of the driving-wheel, and the rake will be instantly elevated. By relieving the wheel J again the rake will fall by its own gravity and be held down, as above described.

The ends of the teeth of my rake, it will be seen in the drawings, are bent up, as shown at P, Fig. 1. This will form a shoe which will prevent the tines from gathering dead grass, or scraping too deep into the ground, drawing up dead roots, &c., which increases the draft on the horses, and is very apt to injure the rake-teeth.

Having thus described my invention, what I claim, and desire to secure by Letters Patent, is—

Operating the rake so as to raise or hold it in a depressed state, by means of the friction-wheel hung in movable bearings, and between the rim or flange of the driving-wheel and a friction-roller, essentially as set forth.

J. C. STODDARD.

Witnesses:
R. T. CAMPBELL,
M. M. LIVINGSTON.